(12) United States Patent
Tangen et al.

(10) Patent No.: US 6,749,943 B1
(45) Date of Patent: Jun. 15, 2004

(54) SILANE BASED MOISTURE CURING HOT-MELT ADHESIVES

(75) Inventors: John C. Tangen, Mahtomedi, MN (US); Robert D. Waid, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/188,208

(22) Filed: Jul. 2, 2002

(51) Int. Cl.$^7$ ................................................ B32B 9/04
(52) U.S. Cl. .................... 428/447; 428/448; 428/355 R; 525/440; 525/458; 528/28; 528/59
(58) Field of Search ................................ 525/440, 458, 525/131; 528/28, 59, 49; 428/448, 355 R, 497; 524/588, 589; 656/327, 331.4

(56) References Cited

U.S. PATENT DOCUMENTS

| | | |
|---|---|---|
| 4,687,533 A | 8/1987 | Rizk et al. |
| 4,871,590 A | 10/1989 | Merz et al. |
| 5,418,310 A | 5/1995 | Kangas |
| 5,559,196 A | 9/1996 | Stobbie, IV et al. |
| 5,869,593 A | 2/1999 | Helmeke et al. |
| 5,880,167 A | 3/1999 | Krebs et al. |
| 5,908,700 A | 6/1999 | Shimizu et al. |
| 6,005,047 A | 12/1999 | Shaffer et al. |
| 6,077,902 A | 6/2000 | Roesler et al. |
| 6,197,912 B1 | 3/2001 | Huang et al. |
| 6,265,517 B1 | 7/2001 | Stuart |
| 6,482,523 B1 * | 11/2002 | Morikawa et al. ........ 428/423.1 |
| 2002/0168515 A1 * | 11/2002 | Murata et al. .............. 428/343 |
| 2002/0188068 A1 * | 12/2002 | Mack et al. ................. 525/100 |

FOREIGN PATENT DOCUMENTS

WO    WO 02/068501 A2    9/2002

OTHER PUBLICATIONS

U.S. patent application Ser. No.: 09/918,261; John C. Tangen; Filed: Jul. 30, 2001.
OSI Specialties; SILQUEST® A–Link™ 15 Silane; Secondary Amino Silane Crosslinker for Urethane Adhesives and Sealants; Technical Data Sheet.
Degussa Corporation; DYNASYLAN® 1189 Silane; Technical Data Sheet.
LYONDELL; PPG–1025; Technical Data Sheet.
RUCO Polymers; Rucoflex Saturated Polyester Diol S–180; Technical Data Sheet.
LYONDELL; Acclaim™ Polyol 4220N; Technical Data Sheet.
UNIQEMA; Dimerised Fatty Acids Technology for use in Polyurethanes; The underlying principle: PRIPOL dimerised fatty acid; Technical Data Sheet.
OSI Specialties; SILQUEST® Silanes; Products and Applications; Technical Data Sheet.
OSI Specialties; SILQUEST® Y–9669 Silane; Material Safety Data Sheet.

* cited by examiner

*Primary Examiner*—David J. Buttner
*Assistant Examiner*—Christopher Keehan
(74) *Attorney, Agent, or Firm*—Daniel R. Pastirik

(57) ABSTRACT

A moisture curable, hot melt composition is described comprising the product of reacted components, the components comprising: (a) a semi-crystalline polyol; (b) an amorphous polyol comprising secondary hydroxyl groups; (c) a secondary aminosilane endcapper comprising secondary amino functionality; (d) an isocyanate; and (e) substantially no tin. A method for the manufacture of the moisture curable, hot melt adhesive and/or sealant composition is described as well as methods for using the adhesive.

53 Claims, No Drawings

SILANE BASED MOISTURE CURING HOT-MELT ADHESIVES

The invention relates to a moisture curable, hot melt composition, to a method for the manufacture of the moisture curable, hot melt composition, to a cured adhesive composition based on the moisture curable, hot melt composition and to articles bonded with the moisture curable, hot melt composition.

BACKGROUND OF THE INVENTION

Isocyanate-terminated polyurethane prepolymers (sometimes referred to hereinafter as "polyurethane prepolymers" or "prepolymers") are desirable in a variety of applications. For example, they can be used in reactive hot melt urethane adhesive, coating and/or sealant systems. Hot melt urethane systems are solid at room temperature, melt to a viscous liquid when heated to moderate temperatures (e.g., 55° C.–121° C.), and are applied in a molten state to an appropriate substrate. On the substrate, the adhesive cools to a solid state to provide an initial bond strength (sometimes referred to as "green strength"), and eventually the adhesive will achieve its ultimate bond strength in a curing reaction with ambient moisture. In the presence of an appropriate catalyst, typically a tin-based catalyst, urethane hot melts have rapid rates of cure and provide excellent final properties when cured. Other advantages associated with hot melt adhesives include rapid green strength, bonding without fixturing, and adhesion to a wide variety of substrates While widely used, hot melt urethanes have not been problem-free. These adhesive systems may contain a level of free monomeric isocyanate that can raise concerns regarding possible toxicity. Toxicity issues may become especially important in the application of hot melt adhesives to substrates using spraying and other dispensing methods for applying a hot melt adhesive to a substrate at high temperatures (>275° F.). Because of the foregoing concerns, the use of urethane hot melts has been banned from some industrial sites. In addition to toxicity issues, urethane hot melt adhesives emit carbon dioxide during the curing process. The generation of carbon dioxide in amorphous adhesives can cause undesired bubble formation in the body of the adhesive during the curing process. Problems have also been noted in the otherwise accepted use of tin based catalysts for catalyzing the curing reaction of polyester urethane hot melts. For example, the presence of tin in a urethane hot melt that is based on one or more polyester monomers can adversely affect the hydrolytic stability of the polyester and the thermal stability of the prepolymer.

In one approach to addressing the foregoing toxicity issue, some urethane hot melt adhesives have been end capped with an organo-functional silane to reduce the potential for significant isocyanate toxicity. Such adhesives still require the use of tin-based catalysts to generate acceptable cure rates through the organo-silane groups.

It is desirable to provide a polyester based hot melt adhesive that can be manufactured without the need for a tin-based catalyst but which also has an acceptable and relatively rapid rate of cure.

SUMMARY OF THE INVENTION

In a first aspect, the invention provides a moisture curable, hot melt composition comprised of the product of reacted components, the components comprising:

(a) a semi-crystalline polyol;
(b) an essentially amorphous polyol selected from the group consisting of polyols having branched primary hydroxyl groups, polyols having secondary hydroxyl groups, and combinations of the foregoing;
(c) a secondary aminosilane endcapper comprising secondary amnino functionality;
(d) an isocyanate; and
(e) substantially no tin.

In another aspect, the invention provides a method for the manufacture of a moisture curable, hot melt adhesive and/or sealant composition, the method comprising:

(a) preparing a prepolymer by:
    (i) mixing a semi-crystalline polyol, an essentially amorphous polyol, an isocyanate and, optionally, a non-tin catalyst, the essentially amorphous polyol selected from the group consisting of polyols having branched primary hydroxyl groups, polyols having secondary hydroxyl groups and combinations thereof;
    (ii) reacting the mixture to provide the prepolymer;
(b) reacting the prepolymer with a secondary aminoalkoxysilane endcapper comprising secondary amino functionality to provide the moisture curable, hot melt adhesive and/or sealant composition; and
the steps (a) and (b) are accomplished in the absence of tin catalyst.

In the foregoing aspects of the invention, the semi-crystalline polyol may be a polyester-based polyol selected from a variety of materials including polyhexamethylene sebacate, polyhexamethylene adipate, polybutylene adipate, polyhexamethylene dodecanedioate, poly-epsilon-caprolactone, and combinations thereof. The semi-crystalline polyol comprises the reaction product of a diol and a polyacid (e.g., a dicarboxylic acid). The essentially amorphous polyol may comprise a copolymer of ethylene oxide and propylene oxide, partially end capped with ethylene oxide and having a hydroxyl number between about 10 and about 100. The amorphous polyol can have a crystallinity index less than or equal to about 0.25. In some embodiments, the essentially amorphous polyol comprises a mixture of primary hydroxyl-containing and secondary hydroxyl-containing materials. The isocyanate may comprise a material selected from the group consisting of aliphatic isocyanates, aromatic isocyanates, derivatives of aliphatic isocyanates, derivatives of aromatic isocyanates and combinations of the foregoing. The foregoing adhesive may be provided in a variety of configurations such as a film, for example.

The secondary arninosilane endcapper may comprise any of a variety of silane including N-alkyl-aminoalkyl-alkoxysilane selected from the group consisting of N-methyl-3-amino-2-methylpropyltrimethoxysilane; N-ethyl-3-anino-2-methylpropyltrimethoxysilane; N-ethyl-3-amino-2-methylpropyldiethoxymethylsilane; N-ethyl-3-amino-2-methylpropyltriethoxysilane; N-ethyl-3-amino-2-methylpropyldimethoxymethylsilane; N-butyl-3-amino-2-methylpropyltrimethoxysilane; N-ethyl4-amino-3,3-dimethylbutyldimethoxymethylsilane; N-ethyl-4-amino-3,3-dimethylbutyltrimethoxysilane and combinations of the foregoing. In general, the secondary aminosilane endcapper comprises a material having the formula:

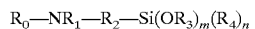

$R_0-NR_1-R_2-Si(OR_3)_m(R_4)_n$ where $R_0$ is aliphatic,
$R_1$ is hydrogen,
$R_2$ is a straight, branched, or cyclic aliphatic chain,
$R_3$ and $R_4$ are $C_1-C_6$ alkyl, m=1–3, and n=0–2.

In one preferred embodiment, the (a) the semi-crystalline polyol is polyhexamethylene adipate; (b) the essentially amorphous polyol is a polyoxypropylene glycol comprising secondary hydroxyl groups; (c) the secondary aminosilane endcapper is N-ethyl-3-amino-propyltrimethoxysilane; and (d) the isocyanate is 4,4'-diphenylmethane diisocyanate.

In another aspect of the invention, a cured adhesive and/or sealant composition is provided, derived from the curable, hot melt adhesive and/or sealant composition described above.

In still another aspect of the invention, a curable, hot melt adhesive is provided by the foregoing method of manufacture, and upon curing, provides a cured adhesive derived therefrom.

In still another embodiment of the invention, a bonded article is provided, comprising:

a first substrate;

a second substrate; and the foregoing cured adhesive composition (derived from the foregoing moisture curable, hot melt composition) between the first substrate and the second substrate and affixing the first and second substrates to one another.

In still another aspect, the invention provides a tape comprising a backing and having the aforementioned moisture curable, hot melt composition associated with at least one major surface of the backing.

Other features of the invention will be more fully appreciated by those skilled in the art upon consideration of the remainder of the disclosure including the Detailed Description of the Preferred Embodiment, including the Examples and the appended claims.

DETAILED DESCRIPTION OF THE PREFERRED EMBODIMENT

The present invention relates to hot melt adhesives and coatings. In general, adhesives of the invention comprise a product of reacted components. In broad terms, the components comprise (a) a semi-crystalline polyol; (b) an amorphous polyol comprising hydroxyl groups, typically secondary hydroxyl groups; (c) an isocyanate; (d) an aminoalkoxysilane endcapper comprising secondary amino functionality; and (e) substantially no tin. The adhesive generally requires the preparation of a isocyanate-terminated polyurethane prepolymer using the components (a), (b) and (c). The isocyanate moieties of the prepolymer are reacted with an aminoalkoxysilane endcapper to provide an aminoalkoxysilane—capped hot melt adhesive with reduced isocyanate toxicity issues, is thermally stable with an extended open time, is resistant to aging and yellowing and, when applied to a surface, cures rapidly to provide strong adhesive bonding.

The semi-crystalline polyol (herein "Component A") of the moisture curable, hot melt adhesive and/or sealant composition is most typically a polyester. Useful polyester monomers include essentially linear, saturated aliphatic material that is at least semicrystalline. By "semicrystalline" it is meant that Component A exhibits both a crystalline melting point (Tm) and a glass transition temperature (Tg), and has a crystallinity index of greater than 0.25. In some embodiments, the crystallinity index is greater than 0.30.

The crystallinity index of a polymer, as used herein, should be understood as being defined in a manner consistent with the understanding of those skilled in the art. As such, the crystallinity index may be defined as the fraction of crystalline material present in a sample of the polymer. A crystallinity index of 1.0 is taken as representing 100% crystallinity and a value of zero corresponding to a completely amorphous material. Crystalline indices have been determined using x-ray diffraction data for the adhesives described herein using a Philips vertical diffractometer (available from Philips Analytical, Natick, Mass.), a copper Kα ("$K_{alpha}$") radiation source, and a proportional detector registry of the scattered radiation. In determining crystallinity indices herein, a diffractometer was fitted with variable entrance slits, a diffracted beam graphite monochromator, and fixed exit slits. An x-ray generator was operated at 45 kilovolts (kV) and 30 milliAmperes (mA) to power a copper target x-ray tube. Data were collected in a reflection geometry from 5 to 55 degrees (corresponding to an angle of "2 theta") using a 0.04 degree step size and 8 second dwell time. Samples of the polyols were prepared for x-ray analysis as thin smears on zero background specimen holders made of single crystal quartz. The program ORIGINS™ (Version 4.1, available from Microcal Software Incorporated, Northhampton, Mass.) was used to perform profile fitting of the diffraction pattern and to measure diffraction peak area values. A Gaussian peak shape model and linear background model were employed to describe the individual crystalline peak and amorphous peak contributions. Crystallinity indices were calculated as the ratio of crystalline peak area to total (crystalline+amorphous) scattered peak area within a 6 to 36 degree (corresponding to an angle of "2 theta") scattering angle range.

Component A may have a melting temperature (Tm) between about 5° C. and 120° C. and generally between about 40° C. and 105° C. Additionally, Component A typically will have a glass transition temperature (Tg) below about 0° C. If Component A is provided in the form of a polyester polyol, it may comprise the reaction product of (1) a polyol such as, for example, a diol, and (2) a polyacid, for example, a dicarboxylic acid. Alternatively, Component A may comprise the oligomer of a ring opened lactone such as, for example, polycaprolactone.

Component A will typically hake a number average molecular weight (Mn) of at least about 2000, generally at least between about 2200 and about 10,000, and in specific embodiments between about 2500 and about 8500. At an Mn below about 2000, the resultant prepolymer is soft and may lack cohesive strength in the uncured state. At an Mn above about 10,000, the resultant prepolymer can be viscous at the application temperature of the composition. If so, it may be more difficult to deposit acceptably thin lines of adhesive on a substrate. The application temperature may be, for example, a temperature between about 200° F. (93° C.) and 300° F. (149° C.).

Suitable diols useful in preparing the hydroxy-functional material Component A include, for example, those having from 2 to 12 methylene groups such as ethylene glycol, 1,4-butanediol, 1,5-pentanediol, 1,6-hexanediol, 1,8-octanediol, and 1,10-decanediol. Cycloaliphatic diols such as, for example, 1,4-cyclohexanediol and 1,4-cyclohexanedimethanol may also be employed.

Suitable dicarboxylic acids useful in preparing the hydroxy-functional material of Component A include, for example, those having from about 2 to 10 methylene groups such as succinic acid, glutaric acid, adipic acid, sebacic acid, azelaic acid, and 1,12-dodecanedioic acid. Included within the scope of useful acids are acid derivatives such as acid anhydrides, acid halides, and alkyl esters such as, for example, the methyl and ethyl esters.

Certain examples of a suitable Component A of the invention include, for exarnple, polyhexamethylene sebacate, polyhexamethylene adipate, polybutylene adipate, polyhexamethylene dodecanedioate, poly-epsilon-caprolactone, and combinations thereof. In some embodiments, the essentially semicrystalline polyester polyol is polyhexamethylene sebacate or polyhexamethylene adipate. In specific embodiments, the essentially semicrystalline polyester polyol is polyhexamethylene adipate which is the reaction product of 1,6-hexanediol and adipic acid.

Examples of commercially available essentially semicrystalline polyester polyols useful in the invention include, for example, those available under the trade designations RUCOFLEX S-1074P-30 and RUCOFLEX S-105P-30, both available from Ruco Polymer Corporation, Hicksville, N.Y.

Another component for the formation of the polyurethane prepolymer is an essentially amorphous polyol (herein "Component B"). The amorphous polyol may comprise primary hydroxyl groups on a branched aliphatic chain, secondary hydroxyl groups and/or combinations of the foregoing. Most typically, the amorphous polyol comprises secondary hydroxyl groups. An "essentially amorphous" material should be understood to include all amorphous materials and all materials that exhibit a crystallinity index less than or equal to about 0.25, and in some instances exhibit a crystallinity index of no greater than 0.20. Component B may exhibit a weak Tm or it may have no measurable Tm.

Component B may comprise any of a variety a known amorphous polyol materials, such as those commercially available under the trade designation ACCLAIM 2220, a copolymer diol based on propylene oxide and ethylene oxide having a molecular weight of about 2250 and a hydroxyl number between 48.5 and 51.5, commercially available from Bayer Corporation, Pittsburgh, Penn.; those available under the trade designation PPG-1000, also commercially available from Bayer Corporation. Additionally, 2,3-butanediol; 1,2-butanediol; 1,2-propanediol; 2-methyl-1,3-propanediol (MP Diol) as well as combinations of two or more of the foregoing materials and polyester diols derived from the foregoing alkyldiols may also be employed. The amorphous polyol of Component B may comprise a polyoxypropylene glycol partially endcapped with ethylene oxide as well as copolymers of propylene oxide and ethylene oxide partially endcapped with ethylene oxide, such materials having a hydroxy number between about 10 and about 100, and more typically between about 20 and about 60. The foregoing ethylene oxide capped materials contain the desired secondary hydroxyl groups while also exhibiting greater reactivity due to the presence of primary hydroxyl groups. Component B may also comprise mixtures of primary hydroxyl-containing and secondary hydroxyl-containing materials, or alternatively a material that possesses both primary and secondary hydroxyl groups thereon.

Another component used to prepare the isocyanate-terninated prepolymer is an isocyanate material (Component C) which may also be a polyisocyanate. Polyisocyanates used in the formation of the urethane prepolymers may be aliphatic or aromatic. Suitable aromatic polyisocyanates may include aromatic diisocyanates such as diphenylmethane-2,4'-diisocyanate and/or diphenylmethane 4,4'-diisocyanate (MDI); tolylene-2,4-diisocyanate and -2,6-diisocyanate (TDI) and mixtures thereof. Other examples include: naphthylene-1,5-diisocyanate; triphenylmethane-4, 4',4"-triisocyanate; phenylene-1,3-diisocyanate and -1,4-diisocyanate; dimethyl-3,3'-biphenylene-4,4'-diisocyanate; diphenylisopropylidine-4,4'-diisocyanate; biphenylene diisocyanate; xylylene-1,3-diisocyanate and xylylene-1,4-diisocyanate, and mixtures thereof.

Other useful polyisocyanates are known to those skilled in the art and may include one or more of the polyisocyanates found in the *Encyclopedia of Chemical Technology*, Kirk-Othlmer, 2nd Ed., vol. 12, pp. 46–47, Interscience Pub., N.Y. (1967), the disclosure of which is incorporated herein by reference thereto. Isocyanate-functional derivative(s) of MDI and TDI may be used, such as liquid mixtures of the isocyanate-fiuctional derivative with melting point modifiers (e.g., mixtures of MDI with polycarbodiimide adducts such as that known under the trade designation ISONATE 143L, commercially available from Dow Chemical Company of Midland Mich.). Small amounts of polymeric diphenylmethane diisocyanates may be included, generally 10% or less by weight of the total isocyanate components including those known as PAPI and the series PAPI 20 commercially available from Dow Chemical Company, the MONDUR MR and MRS series of isocyanates commercially available from Bayer Chemical Corporation, and RUBINATE M isocyanates, commercially available from Huntsman Chemical Company of Houston, Tex. Blocked isocyanate compounds formed by reacting aromatic isocyanates or the above-described isocyanate-functional derivatives with blocking agents such as ketoximes and the like may also be useful as Component C within the invention.

The foregoing Components A, B, and C are used in the formulation of a polyurethane prepolymer. An alkoxysilane endcapper (Component D) is used to react with isocyanate end groups of the polyurethane prepolymer to provide a hot melt adhesive that avoids the aforementioned problems associated with isocyanate—terminated urethanes. The silane endcapper used in the present invention may include any of a variety of (N-alkyl-aminoalkyl)-alkoxysilane materials such as the following secondary aminosilanes:
N-methyl-3-amino-2-methylpropyltrimethoxysilane,
N-ethyl-3-amino-2-methylpropyltrimethoxysilane,
N-ethyl-3-amino-2-methyl propyldiethoxymethylsilane,
N-ethyl-3-amino-2-methylpropyltriethoxysilane,
N-ethyl-3-amino-2-methylpropyldimethoxymethylsilane,
N-butyl-3-amino-2-methylpropyltrimethoxysilane,
N-ethyl-4-amino-3,3-dimethylbutyldimethoxymethylsilane,
N-ethyl-4-amino-3,3-dimethylbutyltrimethoxysilane.

The foregoing alkoxysilane materials and others useful as an endcapper herein may be generally represented by the structure:

$$R_0{-}_{NR1}{-}R_2{-}Si(OR_3)_m(R_4)_n$$

Where $R_0$ is aliphatic, $R_1$ is hydrogen, $R_2$ is a straight, branched, or cyclic aliphatic chain, $R_3$ and $R_4$ are $C_1$–$C_6$ alkyl, m=1–3, and n=0–2.

The polyurethane prepolymers used herein have an organic backbone with unreacted isocyanate groups that are easily silylated by endcapping with an aminosilane. In particular, aminoalkoxysilanes having a secondary amino functionality react readily with the isocyanate groups of the urethane prepolymers to provide inventive adhesives which possess stable urea linkages formed by reaction between the isocyanate and secondary amine functionalities, and which have the desired properties described herein. In the preparation of the hot melt adhesives of the invention, a urethane prepolymer is first prepared. One or more of the Component A hydroxyl-functional materials are selected along with one or more of the hydroxyl functional materials of as Component B. The hydroxyl function materials are first mixed in a suitable vessel, heated and melted. Once melted, the mixture is stirred to ensure thorough blending and is then further heated under vacuum to dry the blend. Next, the container with the dried blend is again heated under mild or "low" heat and stirred while under a nitrogen blanket and isocyanate (Component C) is added in flaked form and mixed into the blend. Most typically 4,4'-diphenylmethane diisocyanate (MDI) is used. A non-tin catalyst may be added with stirring to promote the reaction between MDI and hydroxyl-containing components. One such catalyst is 2,2'-dimorpholinodiethylether (DMDEE), commercially available from Huntsman Chemical Corporation, Houston, Tex. The amount of DMDEE catalyst added to the mixture is low, typically about 0.2% by weight. The exact amount of the catalyst used may vary depending on the combined amounts of Components A, B, C and DMDEE used or employed, and will be known by those skilled in the art.

The foregoing components are stirred to ensure adequate mixing and then are placed in a vacuum oven at 250° F. (121° C.) for between about 2 and about 3 minutes. For those compositions containing a secondary (2°) hydroxyl group, the blended mixture is stirred continuously while kept in the vacuum oven for 2 hours to ensure complete reaction of these groups. Next, the resulting isocyanate terminated prepolymer is heated and stirred under a nitrogen blanket.

The silane Component D is added to the foregoing isocyanate terminated prepolymer with stirring and in an amount to provide about 1.2 equivalents of amino hydrogen (from the silane component) per 1.0 equivalent of remaining, unreacted isocyanate functionality. The resulting silane-capped composition is then put into a vacuum oven and is kept there until it stops frothing, typically between 20 and 30 minutes. The resulting silane-capped composition is pourable at elevated temperature and may be placed into an adhesive cartridge (e.g., 0.1 gallon (0.38 liter) aluminum cartridge) which is typically sealed for subsequent use.

Other aspects relating to the manufacture of the adhesives of the invention may be appreciated upon consideration of the Examples set forth below.

It will also be appreciated that other ingredients or adjuvants may be employed with the blends of the invention to impart to or modify particular characteristics of the composition. These ingredients are included in the overall blends or mixtures of the invention rather than being incorporated into the constituent components thereof. The adjuvants should be added only at a level that does not materially interfere with the adhesion of the composition. The adjuvants may comprise up to 50 weight percent of the uncured composition either individually or in combination. For example, chain-extending agents (e.g., short chain polyols such as ethylene glycol or butanediol); fillers (e.g., carbon black; glass, ceramic, metal or plastic bubbles; metal oxides such as zinc oxide; and minerals such as talc, clays, silica, silicates, and the like), thermoplastic resins; plasticizers; antioxidants; pigments; U.V. absorbers; adhesion promoters and the like may be included to modify set time, open time, green strength build-up, tack, flexibility, adhesion, etc.

Typical fillers suitable for formulation of the sealants include reinforcing fillers such as fumed silica, precipitated silica, calcium carbonates, carbon black, glass fibers, aluminasilicate, clay, zeolites and similar material. These fillers can be used either alone or in combination with each other. The fillers generally comprise up to 300 parts per 100 parts of the silylated polymer with 80 to 150 parts being a more preferred loading level.

Plasticizers customarily employed in sealants can also be used in the compositions of the invention to modify the properties of the adhesive and to facilitate use of higher filler levels. Exemplary plasticizers include phthalates, dipropylene and diethylene glycol dibenzoates and mixtures thereof, epoxidized soybean oil and the like. Useful sources of dioctyl and diisodecyl phthalate include those available under the tradenames JAYFLEX DOP and JAYFLEX DIDP from ExxonMobil Corporation, Houston, Tex. The dibenzoates are available commercially under the trade designation BENZOFLEX 9–88, BENZOFLEX 50 and BENZOFLEX 400 from Velsicol Chemical Corporation of Rosemont, Ill. The plasticizer typically comprises up to 100 parts per hundred parts of the silylated polymer with 40 to 80 parts per hundred being preferred.

The adhesive formulation can include various thixotropic or anti-sagging agents. This class of additives are typified by various castor waxes, fumed silica, treated clays and polyamides. These additives typically comprise 1 to 10 parts per hundred parts of silylated urethane component with 1 to 6 parts being preferred. Useful thixotropes include those available as: AEROSIL from Degussa Corp. of Piscataway, N.J. CAB-O-SIL from Cabot Corp. of Tuscola, Ill., CASTORWAX from CasChem, Inc. of Bayonne, N.J., THIXATROL and THIXCIN from Elementis Specialties, Inc. of Heightstown, N.J., and DISPARLON from King Industries of Norwalk, Conn.

UV stabilizers and/or antioxidants can be incorporated into the sealant formulations of this invention in an amount from 0 to 5 parts per hundred parts of silylated urethane polymer with 0.5 to 2 parts being preferred. These materials are available from companies such as Great Lakes Chemical Corp., Indianapolis, Ind. and Ciba Specialty Chemicals Corporation of Tarrytown, N.Y. under the tradenames: ANOX 20 and UVASIL 299 HM/LM (Great Lakes Chemical Corp., Indianapolis, Ind.), and IRGANOX 1010, IRGANOX 1076, TINUVIN 770, TINUVIN 327, TINUVIN 213 and TINUVIN 622 LD (Ciba Specialty Chemicals), respectively.

In addition, the compositions of the invention may include an effective amount of a catalyst or reaction accelerator such as tertiary amines, co-curatives and the like. An effective amount of a catalyst is, for example, from about 0.005 to 2 percent by weight of the total prepolymer weight. In specific embodiments, the catalyst is present at a level of about 0.01 to about 0.5 percent, based on the total weight of the prepolymers employed.

The hot melt adhesives of the invention may be used for bonding surfaces to one another. Wood, metal, glass surfaces as well as certain plastic surfaces (e.g., polyvinylchloride, acrylonitrile/butadiene/styrene terpolymer, polycarbonate) as well as fiber reinforced plastics may be bonded to one another with the described hot melt adhesives. A quantity of the hot melt composition may be applied to a first substrate or surface using a sealed cartridge, typically preheated to about 250° F. (121° C.) for between 30 and 60 minutes prior to extruding it onto the surface to be bonded. After the adhesive was applied, small diameter (e.g., 0.003–0.005 inch (0.08–0.13 mm)) glass beads or the like may be sparingly applied uniformly on the molten adhesive to control bondline thickness. A bond may be formed by mating the first substrate with another substrate to provide a 0.5 inch by 1.0 inch (1.25 by 2.5 cm) overlap bond area. The substrates may be bonded to one another using pressure such as, for example, firm hand pressure to compress the adhesive to a desired thickness and squeeze excess adhesive from the bond area The assembly should set for several minutes, typically from 5 to 10 minutes. Excess flash (if present) is preferably trimmed from the bottom side of the bonded assembly. At this point, a bond will normally have formed and an initial overlap shear strength may be measured. The bonded substrates should be allowed to cure under ambient conditions for a period of time to achieve an optimum bond strength.

The following non-limiting Examples further illustrate the features of the preferred embodiment. All parts and percentages are by weight unless otherwise stated.

EXAMPLES

As indicated in the Examples that follow, the following test methods and the preparatory procedure are applicable.

Test Method A: Viscosity of Polyurethane Prepolymer Compositions

The initial viscosity of isocyanate-terminated polyurethane prepolymer compositions was determined at 250° F. (121° C.) using a heated Brookfield viscometer (spindle 27) (Thermnosell; available from Brookfield Engineering Laboratories, Stoughton, Mass.). The results are reported in centipoise (milliPascals-second). A sample of the composition, which was stored in a sealed aluminum cartridge, was then maintained at 250° F. (121° C.) for 20 hours and the viscosity measurement was repeated to provide an aged viscosity value.

Test Method B: Overlap Shear Strength

Overlap Shear Strength was determined using a maple wood substrate as follows. A 0.5 gram (±0.05 grams) quantity of the hot melt composition to be tested was preheated in a sealed cartridge at 250° F. (121° C.) for between 30 and 60 minutes prior to extruding it onto one end portion of a 1 inch (2.5 cm) wide by 4 inch (10 cm) long by 0.31 inch (0.8 cm) thick section of a smooth maple wood panel (available from Martin Lumber, St. Paul, Minn.). The wood substrate had been previously conditioned for 7 days at about 77° F. (25° C.) and 50% relative humidity. After the adhesive was applied, 0.003–0.005 inch (0.08–0.13 mm) diameter glass beads were sparingly sprinkled uniformly on the molten adhesive to control bondline thickness. An overlap bond was then formed in the lengthwise direction by immediately mating the substrate with another piece of maple to provide a 0.5 inch by 1.0 inch (1.25 by 2.5 cm) overlap bond area. Firm hand pressure was applied to compress the adhesive to a thickness of 0.003–0.005 inches (0.08–0.13 mm) and to squeeze excess adhesive from the bond area. The test assembly was not moved for between 5 and 10 minutes. Excess flash (if present) was trimmed from the bottom side of the assembly. At this point a bond had formed and the initial overlap shear strength was measured. The bonded substrates were allowed to cure at about 77° F. (25° C.) and 50% relative humidity for various periods of time before testing for overlap shear strength.

The resulting test coupon was tested for overlap shear strength at a crosshead speed of 2 inches/minute (5.1 centimeters/minute) using a SINTECH 10 Tensile Tester (available from MTS Systems Corporation, Eden Prairie, Minn.). Three test coupons were evaluated, the load values obtained were multiplied by 2 to normalize to a 1 square inch overlap area, and an average value for overlap shear strength was calculated. The results are reported in pounds per square inch (psi) (MegaPascals, MPa). In one embodiment, a value of 1000 psi after 24 hours was desired.

General Preparation of Isocyanate—Terminated Polyurethane Prepolymers

The hydroxy-functional materials Component A and, where used, Component B having higher molecular weights (eg., those having a molecular weight of about 400 or greater) were combined in a 1 pint (0.47 liter) paint can container which was then placed in a 250° F. (121° C.) oven to melt the materials therein. Once melted, the mixture was stirred to ensure thorough blending. The container was then put into a vacuum oven (at about 30 inches Hg) at 250° F. (121° C.) for 3 hours to dry the blend. Next, the container with the dried blend was placed on a hot plate (Model 700–5011, available from Barnant Company, Barrington, Ill.), set on "low" heat to give a surface temperature between about 200 and 230° F. (93 and 110° C.) and stirred, under a nitrogen blanket, using an air motor equipped with a stainless steel propeller blade. Then, where used, Component B having low molecular weights, (eg., those having a molecular weight of less than 400) were added and mixed in a similar manner. Next, 4,4'-diphenylmethane diisocyanate (MDI) was selected as Component C. The MDI was in flaked form, was added and mixed in. Finally, 2,2'-dimorpholinodiethylether (FASTCAT DMDEE, a catalyst which promotes the reaction between MDI and hydroxyl-containing components, available from Huntsman Chemical Corporation, Houston, Tex.) was added with stirring. The amount of DMDEE catalyst was 0.2% by weight, based on the combined weight of the hydroxy-functional material(s), MDI, and DMDEE used. Where a tin catalyst was employed it was added in place of DMDEE. The amount of tin catalyst was 0.1% by weight, based on the combined weight of the hydroxy-functional material(s), MDI, and tin catalyst used. After the components were all added, the mixture was stirred an additional 10 minutes and then placed in a vacuum oven at 250° F. (121° C.) for between 2 and 3 minutes. For those compositions containing a secondary (2°) hydroxyl group, the blended mixture was left in the vacuum oven for 2 hours to ensure complete reaction of these groups. Next, the degassed mixture was put back on the hot plate and stirred as before under a nitrogen blanket. The silane Component D, where used, was added, with stirring, in an amount to provide 1.2 equivalents of amino hydrogen (from the silane component) per 1.0 equivalent of remaining, unreacted isocyanate functionality. The resulting silane-capped composition was then put into the vacuum oven and kept there until it stopped frothing, typically between 20 and 30 minutes. The silane-capped composition was poured into a 0.1 gallon (0.38 liter) aluminum cartridge and sealed.

Examples 1–21 and Comiarative Examples 1–19

Examples 1–21 and Comparative Examples 1–19 were prepared using the materials and amounts (in parts by weight, pbw) shown in Tables 1, 3, 5, 7, 9, 11, 13, and 15 below, as described in "General Preparation of Isocyanate-terminated Polyurethane Prepolymers" above (including the use of catalyst). Component A refers to the semi-crystalline, hydroxy-functional material poly(hexamethylene adipate), herein designated as PHA available under the designation RUCOFLEX S-105P-42, having a calculated molecular weight of about 2610 and a hydroxyl number between about 40 and about 46 from Bayer Corporation, Pittsburgh, Penn. Component B refers to the amorphous dihydroxy-functional material. For Component B the following materials were used: PPG 1000 polypropylene glycol having a molecular weight of about 1000 and a hydroxyl number of between about 107.4 and about 115.4, available from Bayer Corporation, Pittsburgh, Penn.; ACCLAIM 4220N copolymer diol based on propylene oxide and ethylene oxide having a molecular weight of about 4000 and a hydroxyl number between 26.5 and 29.5, available from Bayer Corporation, Pittsburgh, Penn.; ACCLAIM 2220N copolymer diol based on propylene oxide and ethylene oxide having a molecular weight of about 2250 and a hydroxyl number between 48.5 and 51.5, available from Bayer Corporation, Pittsburgh, Penn.; 2,3-butanediol (molecular weight of 90.1, available from Aldrich Chemical Company, Milwaukee, Wis.); 1,2-butanediol (molecular weight of 76.1, available from Aldrich Chemical Company, Milwaukee, Wis.); 1,3-propanediol (molecular weight of 76.1, available from Aldrich Chemical Company, Milwaukee, Wis.); 1,2-propanediol (molecular weight of 76.1, available from Aldrich Chemical Company, Milwaukee, Wis.); RUCOFLEX XF-6178-50 (referred to herein as DEG Adipate), polyester-polyether-based polyol having a hydroxyl number of between about 47 and about 53, a calculated molecular weight of between about 2170 and about 2447, and a theoretical functionality of about 2.05, obtained from Bayer Corporation, Pittsburgh, Penn.; RUCOFLEX S-108P-46 propylene adipate polyol having a hydroxyl number of between about 43.5 and about 48.5, a nominal molecular weight about 2400, and a theoretical functionality of about 2.0, obtained from Bayer Corporation, Pittsburgh, Penn.; RUCOFLEX S-1010P-55 2-methyl-1,3-propanediol adipate (referred to herein as MP diol adipate) a polyester-based polyol having a hydroxyl number of between about 52 and about 58, a nominal molecular weight of about 2040, and a theoretical functionality of about 2.0, obtained from Bayer Corporation, Pittsburgh, Penn.; diethylene glycol (molecular weight of 106.1, available from Fisher Scientific Company Fair Lawn, N.J.); ethylene glycol (molecular weight of 62.1, available from J. T. Baker Company, Phillipsburg, Penn.); 1,4-butanediol (molecular weight of 90.1, available from Alfa Aesar Company, Ward Hill, Mass.); and PRIPOL 2033 $C_{36}$ dimer diol derived from dimerized fatty acids, having a hydroxyl number of between about 202 and about 212, and a calculated molecular weight of about 530, available from Uniqema, Wilmington, Del. In two examples 1,2-butanediol was employed as a second Component B. ACCLAIM 4220N and ACCLAIM 2220N copolymers were neutralized using 40 parts per million (ppm) phosphoric acid prior to use.

Comparative Examples 7–11 all contained 0.1% by weight of UTNILIN 425 (a mono-hydroxy functional polyethylene wax having a number average molecular weight of about 425, available from Baker Petrolite, Polymers Division, Sugar Land, Tex.) based on the combined weight of Components A, B, C, DMDEE and the UNILIN wax. The UNIILIN 425 was added to the polyol blend with stirring to ensure adequate mixing prior to the addition of Component C.

For Examples 1–20 and Comparative Examples 1–16, the silane Component D, where used, was SILQUEST® A-Link™ 15 silane (N-ethyl-amino isobutyl trimethoxy silane, available from OSI Specialties, a division of Crompton Corporation, Greenwich, Conn.). For Example 21 the silane component used was DYNASYLAN® 1189 (Nn-butyl)aminopropyltrimethoxysilane, available from Degussa Corporation, Parsippany, N.J.). For Comparative Example 17 the silane component used was SILQUESTO® A-189 Silane (gamma-Mercaptopropyltrimethoxysilane, available from OSI Specialties, a division of Crompton Corporation, Greenwich, Conn.). For Comparative Example 18 the silane component used was SILQUEST® Y-9669 N-Phenyl-gamma-aminopropyltrimethoxysilane, available from OSI Specialties, a division of Crompton Corporation, Greenwich, Conn.). The prepolymer compositions were evaluated for viscosity (initial and after thermal aging for 20 hours) and overlap shear strength (initial, after 24 hours, and after 8 weeks) as described in the test methods above. The results are shown in Tables 2, 4, 6, 8, 10, 12, 14, and 16 below.

TABLE 1

|  | C.Ex. 1 | C.Ex. 2 | C.Ex. 3 | Example 1 | Example 2 |
|---|---|---|---|---|---|
| Component A (pbw) | PHA 90 | PHA 100 | PHA 100 | PHA 99.0 | PHA 95.0 |
| Component B (pbw) | PPG-1000 10 | None | None | ACCLAIM 4220 1.0 | ACCLAIM 4220 5.0 |
| Hydroxyl Type of Component B | 2° | N.A. | N.A. | 2°/1° | 2°/1° |
| MDI (pbw) | 21.8 | 18.5 | 18.7 | 18.7 | 18.4 |
| NCO:OH Ratio (equivalents ratio) | 2.0:1.0 | 2.0:1.0 | 2.0:1.0 | 2.0:1.0 | 2.0:1.0 |
| DMDEE (weight %) | 0.2 | 0.2 | None | 0.2 | 0.2 |
| Tin Catalyst (weight %) | None | None | 0.1 | None | None |
| Silane Endcapper (pbw) | None | 19.7 | 19.9 | 19.9 | 19.6 |

C.Ex. = Comparative Example; N.A. = not applicable

TABLE 2

|  | C.Ex. 1 | C.Ex. 2 | C.Ex. 3 | Example 1 | Example 2 |
|---|---|---|---|---|---|
| Initial Viscosity of Silane-capped Polyurethane Prepolymer at 121° C. (cps) | 2120 | 4275 | 3220 | 3250 | 3400 |
| Thermal Stability (Viscosity after 20 hours @ 121° C.) (cps) | 5400 | 4300 | Gelled | 3400 | 3325 |
| Initial Average Overlap Shear Strength (psi) (MPa) | 447 (3.08) | 382 (2.63) | 497 (3.43) | 327 (2.26) | 322 (2.22) |
| Average Overlap Shear Strength @ 24 hours (psi) (MPa) | 1744 (12.03) | 578 (3.99) | 1311 (9.03) | 1731 (11.94) | 1566 (10.80) |
| Days to Reach 1000 psi (6.9 MPa) Average Overlap Shear Strength | <1 | 28 | <1 | <1 | <1 |

Comparative Example 1 demonstrates the increase in viscosity upon thermal aging for a composition that is not silane-capped and does not contain tin catalyst. Comparative Example 2 shows that a silane-capped composition that is not derived from a secondary hydroxyl-containing polyol and does not contain tin catalyst will only slowly develop significant overlap shear strength. Comparative Example 3, a tin-containing composition which is silane-capped but not derived from a secondary hydroxylcontaining polyol, possesses poor thermal stability as evidenced by gelation after 24 hours at 121° C. In contrast, Examples 1 and 2, which are silane-capped, derived from a secondary hydroxyl-containing polyol, and free of tin, exhibit thermal stability prior to final polymerization and develop significant overlap shear strength within 24 hours.

TABLE 3

|  | Example 3 | Example 4 | C. Ex. 4 | Example 5 | Example 6 |
|---|---|---|---|---|---|
| Component A (pbw) | PHA 90.0 | PHA 90.0 | PHA 90.0 | PHA 99.0 | PHA 69.0 |
| Component B1 (pbw) | ACCLAIM 4220 10.0 | PPG-1000 10.0 | PPG-1000 10.0 | 2,3-Butanediol 1.0 | DEG Adipate 30.0 |
| Component B2 (pbw) | None | None | None | None | 1,2-Butanediol 1.0 |
| Hydroxyl Type of Component B1 | 2°/1° | 2° | 2° | 2° | 1° |
| Hydroxyl Type of Component B2 | N.A. | NA | N.A. | N.A. | 2°/1° |
| MDI (pbw) | 18.1 | 20.4 | 21.8 | 24.0 | 22.5 |
| NCO:OH Ratio (equivalents ratio) | 2.0:1.0 | 1.9:1.0 | 2.0:1.0 | 2.0:1.0 | 1.8:1.0 |
| DMDEE (weight %) | 0.2 | 0.2 | 0.0 | 0.2 | 0.2 |
| Tin Catalyst (weight %) | None | None | 0.1 | None | None |
| Silane Endcapper (pbw) | 19.3 | 20.9 | 23.2 | 25.6 | 24.0 |

TABLE 4

|  | Example 3 | Example 4 | C.Ex. 4 | Example 5 | Example 6 |
|---|---|---|---|---|---|
| Initial Viscosity of Silane-capped Polyurethane Prepolymer at 121° C. (cps) | 3250 | 3050 | 2475 | 3175 | 2925 |
| Thermal Stability (Viscosity after 20 hours @ 121° C.) (cps) | N.D. | 3125 | Gelled | 3000 | 2900 |
| Initial Average Overlap Shear Strength (psi) (MPa) | 322 (2.22) | 272 (1.88) | 347 (2.39) | 347 (2.39) | 159 (1.10) |
| Average Overlap Shear Strength @ 24 hours (psi) (MPa) | 1566 (10.8) | 1583 (19.92) | 1315 (9.07) | 1152 (7.94) | 1098 (7.57) |
| Days to Reach 1000 psi (6.9 MPa) Average Overlap Shear Strength | <1 | <1 | <1 | <1 | <1 |

Examples 3–6 demonstrate the compositions derived from secondary hydroxyl-containing polyols possess the desired characteristics of thermal stability prior to final polymerization while also developing significant overlap shear strength within 24 hours. These examples further show that the secondary hydroxyl source may be a polyol having either only a secondary hydroxyl group, or it may have both secondary and primary hydroxyl groups in the same molecule. Alternatively, a mixture of secondary and primary hydroxyl-containing polyols may be used to obtain the silane-capped prepolymer.

TABLE 5

|  | Example 7 | Example 8 | Example 9 | Example 10 | Example 11 | C. Ex. 5 |
|---|---|---|---|---|---|---|
| Component A (pbw) | PHA 90.0 | PHA 90.0 | PHA 90.0 | PHA 99.0 | PHA 99.9 | PHA 100.0 |
| Component B (pbw) | ACCLAIM 2220 10.0 | PPG 1000 10.0 | PPG 1000 10.0 | PPG 1000 1.0 | PPG 1000 0.1 | None |
| Hydroxyl Type of Component B | 2°/1° | 2° | 2° | 2° | 2° | N.A. |
| MDI (pbw) | 19.1 | 20.4 | 19.7 | 19.0 | 18.8 | 18.7 |
| NCO:OH Ratio (equivalents ratio) | 2.0:1.0 | 2.0:1.0 | 1.9:1.0 | 2.0:1.0 | 2.0:1.0 | 2.0:1.0 |
| DMDEE (weight %) | 0.2 | None | 0.2 | 0.2 | 0.2 | 0.2 |
| Silane Endcapper (pbw) | 20.3 | 20.9 | 20.8 | 20.3 | 20.0 | 19.9 |

TABLE 6

|  | Example 7 | Example 8 | Example 9 | Example 10 | Example 11 | C.Ex. 5 |
|---|---|---|---|---|---|---|
| Initial Viscosity of Silane-capped Polyurethane Prepolymer at 121° C. (cps) | 3250 | 3550 | 3275 | 3325 | 2700 | 2025 |
| Initial Average Overlap Shear Strength (psi) (MPa) | 218 (1.50) | 387 (2.67) | 272 (1.88) | 345 (2.38) | 391 (2.70) | 382 (2.63) |
| Average Overlap Shear Strength @ 24 hours (psi) (MPa) | 1546 (10.66) | 1543 (10.64) | 1583 (10.92) | 1691 (11.66) | 1991 (13.73) | 578 (3.99) |
| Days to Reach 1000 psi (6.9 MPa) Average Overlap Shear Strength | <1 | <1 | <1 | <1 | <1 | 28 |

The results in Table 6 show that as little as 0.1 pbw of the secondary hydroxyl-containing polyol can be used to form a silane-capped prepolymer which provides significant overlap shear strength within 24 hours. These results also demonstrate that silane-capped prepolymers derived from secondary hydroxyl-containing polyols can provide the compositions of the present invention without requiring the use of a catalyst such as DMDEE.

TABLE 7

|  | Example 12 | Example 13 | Example 14 | Example 15 | Example 16 |
|---|---|---|---|---|---|
| Component A (pbw) | PHA 90.0 | PHA 90.0 | PHA 99.0 | PHA 90.0 | PHA 99.0 |
| Component B (pbw) | 1,2-Propanediol Adipate 10.0 | 1,2-Propanediol Adipate 10.0 | 1,2-Propanediol 1.0 | MP Diol Adipate 10.0 | 1,2-Butanediol 1.0 |
| Hydroxyl Type of Component B | 2°/1° | 2°/1° | 2°/1° | 1° | 2°/1° |
| MDI (pbw) | 18.9 | 18.9 | 25.0 | 19.3 | 24.0 |
| NCO:OH Ratio (equivalents ratio) | 2.0:1.0 | 2.0:1.0 | 2.0:1.0 | 2.0:1.0 | 2.0:1.0 |
| DMDEE (weight %) | 0.2 | None | 0.2 | 0.2 | 0.2 |
| Silane Endcapper (pbw) | 20.1 | 20.1 | 26.6 | 20.6 | 25.6 |

TABLE 8

|  | Example 12 | Example 13 | Example 14 | Example 15 | Example 16 |
|---|---|---|---|---|---|
| Initial Viscosity of Silane-capped Polyurethane Prepolymer at 121° C. (cps) | 3300 | 3425 | 3100 | 3900 | 3050 |
| Initial Average Overlap Shear Strength (psi) (MPa) | 319 (2.20) | 272 (1.88) | 321 (1.81) | 323 (2.23) | 330 (1.86) |
| Average Overlap Shear Strength @ 24 hours (psi) (MPa) | 1655 (11.41) | 1583 (10.92) | 1396 (7.89) | 1416 (9.77) | 1418 (9.78) |
| Days to Reach 1000 psi (6.9 MPa) Average Overlap Shear Strength | <1 | <1 | <1 | <1 | <1 |

The results in Table 8 and previous ones demonstrate that a variety of secondary hydroxyl-containing polyols can be used at various levels to prepare silane-capped compositions of the present invention. Example 15 provides the desired characteristics without being derived from a secondary hydroxyl-containing polyol. This is believed to be due to polymer chain disordering resulting from the use of this primary hydroxyl-containing polyol having a branched aliphatic chain, or the previously described secondary hydroxyl-containing polyols. Other branched primary hydroxyl-containing polyols will be known by those skilled in the art and may provide the same polymer chain disordering.

TABLE 9

|  | Example 17 | C.Ex. 6 | Example 18 | C.Ex. 7 |
|---|---|---|---|---|
| Component A (pbw) | PHA 99.0 | PHA 99.0 | PHA 69.0 | PHA 70.0 |
| Component B1 (pbw) | 2,3-Butanediol 1.0 | DEG 1.0 | DEG Adipate 30.0 | DEG Adipate 30.0 |
| Component B2 (pbw) | None | None | 1,2-Butanediol 1.0 | None |
| Hydroxyl Type of Component B1 | 2° | 1° | 1° | 1° |
| Hydroxyl Type of Component B2 | N.A. | N.A. | 2°/1° | N.A. |
| MDI (pbw) | 24.0 | 22.7 | 22.5 | 18.0 |
| NCO:OH Ratio (equivalents ratio) | 2.0:1.0 | 2.0:1.0 | 1.8:1.0 | 1.8:1.0 |
| DMDEE (weight %) | 0.2 | 0.2 | 0.2 | 0.2 |
| Silane Endcapper (pbw) | 25.6 | 24.1 | 24.0 | 17.0 |

TABLE 10

|  | Example 17 | C.Ex. 6 | Example 18 | C.Ex. 7 |
|---|---|---|---|---|
| Initial Viscosity of Silane-capped Polyurethane Prepolymer at 121° C. (cps) | 3175 | 2100 | 2925 | 3700 |
| Initial Average Overlap Shear Strength (psi) (MPa) | 347 (2.39) | 442 (3.05) | 159 (1.10) | 342 (2.36) |
| Average Overlap Shear Strength @ 24 hours (psi) (MPa) | 1152 (7.88) | 648 (4.47) | 1098 (7.57) | 332 (2.29) |
| Days to Reach 1000 psi (6.9 MPa) Average Overlap Shear Strength | <1 | >21 | <1 | 21 |

TABLE 11

|  | C.Ex. 8 | C.Ex. 9 | C.Ex. 10 | C.Ex. 11 | C.Ex. 12 |
|---|---|---|---|---|---|
| Component A (pbw) | PHA 95.0 | PHA 90.0 | PHA 80.0 | PHA 90.0 | PHA 70.0 |
| Component B (pbw) | DEG Adipate 5.0 | DEG Adipate 10.0 | DEG Adipate 20.0 | Pripol 2033 10.0 | Pripol 2033 30.0 |
| Hydroxyl Type of Component B | 1° | 1° | 1° | 1° | 1° |
| MDI (pbw) | 18.9 | 19.0 | 18.4 | 23.6 | 31.8 |
| NCO:OH Ratio (equivalents ratio) | 2.0:1.0 | 2.0:1.0 | 1.9:1.0 | 1.8:1.0 | 1.7:1.0 |
| DMDEE (weight %) | 0.2 | 0.2 | 0.2 | 0.2 | 0.2 |
| Silane Endcapper (pbw) | 20.1 | 20.3 | 18.4 | 22.3 | 27.9 |

TABLE 12

|  | C.Ex. 8 | C.Ex. 9 | C.Ex. 10 | C.Ex. 11 | C.Ex. 12 |
|---|---|---|---|---|---|
| Initial Viscosity of Silane-capped Polyurethane Prepolymer at 121° C. (cps) | 4100 | 5100 | 5350 | 2325 | 4700 |
| Initial Average Overlap Shear Strength (psi) (MPa) | 307 (2.12) | 492 (3.39) | 404 (2.79) | 311 (2.14) | 406 (2.80) |
| Average Overlap Shear Strength @ 24 hours (psi) (MPa) | 275 (1.90) | 577 (3.93) | 513 (3.54) | 463 (3.19) | 466 (3.21) |
| Days to Reach 1000 psi (6.9 MPa) Average Overlap Shear Strength | 14 | 10 | 14 | 28 | 14 |

TABLE 13

|  | C.Ex. 13 | C.Ex. 14 | C.Ex. 15 | C.Ex. 16 |
|---|---|---|---|---|
| Component A (pbw) | PMA 99.0 | PHA 99.0 | PHA 99.0 | PHA 99.0 |
| Component B (pbw) | DEG 1.0 | EG 1.0 | 1,4-BD 1.0 | 1,3-PD 1.0 |
| Hydroxyl Type of Component B | 1° | 1° | 1° | 1° |
| MDI (pbw) | 22.7 | 26.4 | 24.0 | 25.0 |
| NCO:OH Ratio (equivalents ratio) | 2.0:1.0 | 2.0:1.0 | 2.0:1.0 | 2.0:1.0 |
| DMDEE (weight %) | 0.2 | 0.2 | 0.2 | 0.2 |
| Silane Endcapper (pbw) | 24.1 | 28.2 | 25.6 | 26.6 |

TABLE 14

|  | C.Ex. 13 | C.Ex. 14 | C.Ex. 15 | C.Ex. 16 |
|---|---|---|---|---|
| Initial Viscosity of Silane-capped Polyurethane Prepolymer at 121° C. (cps) | 2100 | 1275 | 1450 | 1650 |
| Initial Average Overlap Shear Strength (psi) (MPa) | 442 (3.05) | 348 (2.40) | 356 (2.46) | 371 (2.56) |
| Average Overlap Shear Strength @ 24 hours (psi) (MPa) | 648 (4.47) | 615 (4.24) | 446 (3.08) | 586 (4.04) |
| Days to Reach 1000 psi (6.9 MPa) Average Overlap Shear Strength | >21 | >14 | >14 | >14 |

The results in Tables 10, 12 and 14, as well as previous ones, show that compositions derived from essentially linear polyols containing only primary hydroxyl groups fail to provide compositions with the desired characteristics.

TABLE 15

|  | Example 19 | Example 20 | Example 21 | C.Ex. 17 | C.Ex. 18 |
|---|---|---|---|---|---|
| Component A (pbw) | PHA 90.0 | PHA 90.0 | PHA 90.0 | PHA 90.0 | PHA 90.0 |
| Component B (pbw) | PPG-1000 | PPG-1000 | PPG-1000 | PPG-1000 | PPG-1000 |
| Hydroxyl Type of Component B | 2° | 2° | 2° | 2° | 2° |
| MDI (pbw) | 20.4 | 20.4 | 21.7 | 21.7 | 22.8 |
| NCO:OH Ratio (equivalents ratio) | 2.0:1.0 | 1.9:1.0 | 2.0:1.0 | 2.0:1.0 | 2.1:1.0 |
| DMDEE (weight %) | None | 0.2 | 0.2 | 0.2 | 0.2 |
| Silane Endcapper (pbw) | 20.8 | 20.9 | 24.7 | 20.4 | 25.5 |
| Silane and Type | A-15 2° Amino, aliphatic | A-15 2° Amino, aliphatic | Dynasylan 1189 2° Amino, aliphatic | A189 Mercapto | Y9669 2° Amino, aromatic |

TABLE 16

|  | Example 19 | Example 20 | Example 21 | C.Ex. 17 | C.Ex. 18 |
|---|---|---|---|---|---|
| Initial Viscosity of Silane-capped Polyurethane Prepolymer at 121° C. (cps) | 3550 | 3275 | 2450 | 2800 | 1900 |
| Initial Average Overlap Shear Strength psi (MPa) | 387 (2.67) | 272 (1.91) | 253 (1.74) | 349 (2.41) | 211 (1.46) |
| Average Overlap Shear Strength @ 24 hours psi (MPa) | 1543 (10.6) | 1583 (10.9) | 1500 (10.3) | 355 (2.5) | 250 (1.7) |
| Time to Reach 1000 psi (6.9 MPa) Average Overlap Shear Strength | <1 day | <1 day | <1 day | >7 days | >49 days |

The results in Table 16 show that the silane component used to provide the silane-capped moisture curing compositions of the present invention is desirably a secondary aminosilane. In one embodiment the silane component is an (N-alkyl)-aminoalkyl-alkoxysilane exemplified above.

While the preferred embodiment of the invention has been described in detail, It will be appreciated that the invention is not limited to the described embodiment. Certain changes or modifications to the described embodiment may be apparent to those skilled in the art without departing from the scope and spirit of the invention, as set forth in the appended claims.

What is claimed is:

1. A moisture curable, hot melt composition comprised of the product of reacted components, the cormponents comprising:
   (a) a semi-crystalline polyol;
   (b) an essentially amorphous polyol selected from the group consisting of polyols having branched primary hydroxyl groups, polyols having secondary hydroxyl groups, and combinations of the foregoing;

(c) a secondary aminosilane endcapper comprising secondary amino functionality, the secondary aminosilane endcapper comprising a material of the formula:

where
$R_0$ is aliphatic,
$R_1$ is hydrogen,
$R_2$ is a straight, branched or cyclic aliphatic chain,
$R_3$ and $R_4$ are $C_1$–$C_0$ alkyl,
m=1–3, and
n=0–2;

(d) an isocyanate; and
(e) substantially no tin.

2. The moisture curable, hot melt adhesive and/or sealant composition of claim 1, wherein the semi-crystalline polyol is a polyester-based polyol.

3. The moisture curable, hot melt adhesive and/or sealant composition of claim 2 wherein the polyester-based polyol has a crystallinity index of at least about 0.25 and a number average molecular weight of at least about 2000.

4. The moisture curable hot melt adhesive and/or sealant composition of claim 1 wherein the semi-crystalline polyol comprises the reaction product of a polyol and a polyacid.

5. The moisture curable, hot melt adhesive and/or sealant composition of claim 4 wherein the polyol is a diol and the polyacid is a dicarboxylic acid.

6. The moisture curable, hot melt adhesive and/or sealant composition of claim 4 wherein the semi-crystalline polyol is derived from a diol comprising from 2 to 12 methylene groups.

7. The moisture curable hot melt adhesive and/or sealant composition of claim 6 wherein the diol is selected from the group consisting of ethylene glycol; 1,4-butanediol; 1,5 pentanediol; 1,6-hexanediol; 1,8-bctanediol; 1,10 decanediol; 1,4-cyclohexanediol; 1,4-cyclohexanedimethanol; and combinations thereof.

8. The moisture curable hot melt adhesive and/or sealant composition of claim 5 wherein the dicarboxylic acid comprises from about 2 to 10 methylene groups.

9. The moisture curable hot melt adhesive and/or sealant composition of claim 8 wherein the dicarbpxylic acid is selected from the group consisting of succinic acid, glutaric acid, adipic acid, sebacic acid, azelaic acid, and 1,12-dodecanedioic acid; the anhydrides, halides and alkyl esters of the foregoing acids; and combinations of the foregoing.

10. The moisture curable hot melt adhesive and/or sealant of claim 2 wherein the semicrystalline polyol is selected from the group consisting of polyhexamethylene sebacate, polyhexamethylene adipate, polybutylene adipate, polyhexamethylene dodecanedioate, poly-epsilon-caprolactone, and combinations thereof.

11. The moisture curable, hot melt adhesive and/or sealant composition of claim 1 wherein the essentially amorphous polyol consists of branched primary hydroxyl groups.

12. The moisture curable, hot melt adhesive and/or sealant composition of claim 1 wherein the essentially amorphous polyol consists of secondary hydroxyl groups.

13. The moisture curable, hot melt adhesive and/or sealant composition of claim 1 wherein the essentially amorphous polyol consists of combinations of branched primary hydroxyl groups and secondary hydroxyl groups.

14. The moisture curable hot melt adhesive and/or sealant composition of claim 1 wherein the essentially amorphous polyol has a crystallinity index less than or equal to 0.25.

15. The moisture curable, hot melt adhesive and/or sealant composition of claim 1 wherein the essentially amorphous polyol comprises a copolymer diol based on propylene oxide and ethylene oxide having a molecular weight of about 2250 and a hydroxyl number between 48.5 and 51.5.

16. The moisture curable, hot melt adhesive and/or sealant composition of claim 1 wherein the essentially amorphous polyol comprises a material selected from the group consisting of 2,3-butanediol; 1,2-butanediol; 1,2-propanediol; 2-methyl-1,3-propanediol; polyester diols derived from the following alkyldiols; and combinations of two or more of the foregoing materials.

17. The moisture curable, hot melt adhesive and/or sealant composition of claim 1 wherein the essentially amorphous polyol is a polyoxypropylene glycol partially endcapped with ethylene oxide.

18. The moisture curable hot melt adhesive and/or sealant composition of claim 1 wherein the essentially amorphous polyol is a copolymer of propylene oxide and ethylene oxide partially endcapped with ethylene oxide and having a hydroxyl number between about 10 and about 100.

19. The moisture curable, hot melt adhesive and/or sealant composition of claim 1 wherein the secondary aminosilane endcapper comprises an N-alkyl-aminoalkyl-alkoxysilane selected from the group consisting of
N-methyl-3-amino-2-methylpropyltrimethoxysilane;
N-ethyl-3-amino-2-methylpropyltrimethoxysilane;
N-ethyl-3-amino-2-methylpropyidiethoxymethylsilane;
N-ethyl-3-amino-2-methylpropyltriethoxysilane;
N-ethyl-3-amino-2-methylpropyltriethoxymethylsilane;
N-butyl-3-amino-2-methylpropyltrimethoxysilane;
N-ethyl-4-amino-3,3-dimethylbutyldlmethoxymethylsilane;
N-ethyl-4-amino-3,3-dimethylbutyltrimethoxysilane and combinations of the foregoing.

20. The moisture curable hot melt adhesive and/or sealant composition of claim 1 wherein the isocyanate comprises a material selected from the group consisting of aliphatic isocyanates, aromatic isocyanates, derivatives of aliphatic isocyanates, derivatives of aromatic isocyanates and combinations of the foregoing.

21. The moisture curable hot melt adhesive and/or sealant composition of claim 20 wherein the aromatic polyisocyanates are selected from the group consisting of diphenylmethane-2,4-diisocyanate; diphenylmethane-4,4-diisocyanate; tolylene-2,4-diisocyanate; tolylene-2,6-diisocyanate; naphthylene-1,5-diisocyanate; triphenylmethane-4,4'4"-triisocyanate; phenylene-1,3-diisocyanate; phenylene-1,4-diisocyanate; dimethyl-3,3'-biphenylene4,4'-diisocyanate; diphenylisopropylidine-4,4'-diisocyanate; biphenylene diisocyanate; xylylene-1,3-diisocyanate; xylylene-1,4-diisocyanate and combinations of the foregoing.

22. The moisture curable hot melt adhesive and/or sealant composition of claim 1 wherein (a) the semi-rystalline polyol is polyhexamethylene adipate, (b) the amorphous polyol is a polyoxypropylene glycol comprising secondary hydroxyl groups (c) the secondary aminosilane endcapper is N'-ethyl-3-amino-propyltrmethoxysilane; and (d) the isocyanate is 4,4'diphenylmethane diisocyanate.

23. A cured adhesive and/or sealant composition derived from the curable, hot melt adhesive and/or sealant composition of claim 22.

24. A method for the manufacture of a moisture curable, hot melt adhesive and/or sealant composition, the method comprising:

(a) preparing a prepolymer by:
(i) mixing a semi-crystalline polyol, an essentially amorphous polyol, an isocyanate and, optionally, a non-tin catalyst, the essentially amorphous polyol selected from the group consisting of polyols having branched primary hydroxyl groups, polyols having secondary hydroxyl groups, and combinations of the foregoing;

(ii) reacting the mixture to provide the prepolymer;

(b) reacting the prepolymer with a secondary aminoalkoxysilane endcapper comprising secondary amino functionality to provide the moisture curable, hot melt adhesive and/or sealant composition, the secondary aminosilane endcapper comprising a material having the formula:

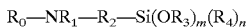

where $R_0$ is aliphatic. $R_1$ is hydrogen, $R_2$ is a straight, branched or cyclic aliphatic chain, $R_3$ and $R_4$ are $C_1$–$C_6$ alkyl, m=1–3, and n=0–2; and the steps of (a) and (b) are accomplished in the absence of tin catalyst.

25. The method of claim 24 wherein the non-tin catalyst comprises 2,2'-dimorpholinodiethylether.

26. The method of claim 24 wherein reacting the mixture of step (a) further comprises heating the mixture.

27. The method of claim 24 wherein reacting the prepolymer with a secondary aminoalkoxysilane endcapper in step (b) comprises adding aminoalkoxysilane endcapper to the prepolymer accompanied by heating and stirring the resulting mixture.

28. The method of claim 24 wherein the semi-crystalline polyol is a polyester-based polyol.

29. The method of claim 28 wherein the polyester-based polyol has a crystallinity index of at least about 0.25 and a number average molecular weight of at least about 2000.

30. The method of claim 24 wherein the semi-crystalline polyol comprises the reaction product of a polyol and a polyacid.

31. The method of claim 30 wherein the polyol is a diol and the polyacid is a dicarboxylic acid.

32. The method of claim 30 wherein the semi-crystalline polyol is derived from a diol comprising from 2 to 12 methylene groups.

33. The method of claim 32 wherein the diol is selected from the group consisting of ethylene glycol; 1,4-butanediol; 1,5-pentanediol; 1,6-hexanediol; 1,8-octanediol; 1,10-decanediol; 1,4-cyclohexanediol; 1,4-cyclohexanedimethanol; and combinations thereof.

34. The method of claim 31 wherein the dicarboxylic acid comprises from about 2 to 10 methylene groups.

35. The method of claim 34 wherein the dicarboxylic acid is selected from the group consisting of succinic acid, glutaric acid, adipic acid, sebacic acid, azelaic acid, and 1,12-dodecanedioic acid; the anhydrides, halides and alkyl esters of the foregoing acids, and combinations of the foregoing.

36. The method of claim 28 wherein the semi-crystalline polyol is selected from the group consisting of polyhexamethylene sebacate, polyhexmethylene adipate, polybutylene adipate, polyhexamethylene dodecanedioate, poly-epsilon-caprolactone, and combinations thereof.

37. The method of claim 24 wherein the essentially amorphous polyol consists of branched primary hydroxyl groups.

38. The method of claim 24 wherein the essentially amorphous polyol consists of secondary hydroxyl groups.

39. The method of claim 24 wherein the essentially amorphous polyol consists of combinations of branched primary hydroxyl groups and secondary hydroxyl groups.

40. The method of claim 24 wherein the essentially amorphous polyol has a crystallinity index less than or equal to 0.25.

41. The method of claim 24 wherein the essentially amorphous polyol comprises a copolymer diol based on propylene oxide and ethylene oxide having a molecular weight of about 2250 and a hydroxyl number between 48.5 and 51.5.

42. The method of claim 24 wherein the essentially amorphous polyol comprises a material selected from the group consisting of 2,3-butanediol; 1,2-butanediol; 1.2-propanediol; 2-methyl-1,3-propanediol; polyester diols derived from the following alkyldiols; and combinations of two or more of the foregoing materials.

43. The method of claim 24 whereinthe essentially amorphous polyol is a polyoxypropylene glycol partially endcapped with ethylene oxide.

44. The method of claim 24 wherein the essentially amorphous polyol is a copolymer of propylene oxide and ethylene oxide partially endcapped with ethylene oxide and having a hydroxyl number between about 10 and about 100.

45. The moisture curable, hot melt adhesive and/or sealant composition of claim 1 wherein the secondary aminosilane endcapper comprises an N-alkyl-aminoalkyl-alkoxysilane selected from the group consisting of
N-methyl-3-amino-2-methylpropyltrimethoxysilane;
N-ethyl-3-amino-2-methylpropyltrimethoxysilane;
N-ethyl-3-amino-2-methylpropyldiethoxymethylsilane;
N-ethyl-3-amino-2-methylpropyltriethoxysilane;
N-ethyl-3-amino-2-methylpropyltriethoxymethylsilane;
N-butyl-3-amino-2-methylpropyltrimethoxysilane;
N-ethyl-4-amino-3,3-dimethylbutyldlmethoxymethylsilane;
N-ethyl-4-amino-3,3-dimethylbutyltrimethoxysilane and combinations of the foregoing.

46. The moisture curable hot melt adhesive and/or sealant composition of claim 1 wherein the isocyanate comprises a material selected from the group consisting of aliphatic isocyanates, aromatic isocyanates, derivatives of aliphatic isocyanates, derivatives of aromatic isocyanates and combinations of the foregoing.

47. The method of claim 46 wherein the aromatic polyisocyanates are selected from the group consisting of diphenylmethane-2,4-diisocyanate; diphenylmethane 4,4-diisocyanate; tolylene-2,4-diisocyanate; tolylene -2,6-diisocyanate; naphthylene-1,5-diisocyanate; triphenylmethane-4,4'4"-triisocyanate; phenylene-1,3-diisocyanate; phenylene-1,4-diisocyanate; dimethyl-3,3'-biphenylene-4,4'-diisocyanate; diphenylisopropylidine4,4'-diisocyanate; biphenylene diisocyanate; xylylene-1,3-dllsocyanate; xylylene-1,4-diisocyanate; and combinations of the foregoing.

48. The method of claim 24 wherein (a) the semi-crystalline polyol is polyhexamethylene adipate, (b) the amorphous polyol is a polyoxypropylene glycol comprising secondary hydroxyl groups (c) the secondary aminosilane endcapper is N'-ethyl-3-amino-propyltrmethoxysilane; and (d) the isocyanate is 4,4'-diphenylmethane diisocyanate.

49. A cured adhesive and/or sealant composition derived from the curable, hot melt adhesive and/or sealant composition of claim 24.

50. A cured adhesive composition derived from the curable, hot melt adhesive and/or sealant composition of claim 49.

51. A bonded article comprising:
a first substrate;
a second substrate; and
the cured adhesive composition of claim 50 between the first substrate and the second substrate and adhesive affixing the first and second substrates to one another.

52. A bonded article comprising:

a first substrate;

a second substrate; and a cured adhesive composition bonding the first substrate and the second substrate to one another, the cured adhesive derived from the moisture curable, hot melt composition of claim 1.

53. A tape, comprising:

a backing having first and second major surfaces;

the moisture curable, hot melt composition of claim 1 associated with at least one of the first or second major surfaces of the backing.

\* \* \* \* \*

UNITED STATES PATENT AND TRADEMARK OFFICE
CERTIFICATE OF CORRECTION

PATENT NO. : 6,749,943 B1
DATED : June 15, 2004
INVENTOR(S) : Tangen, John C.

It is certified that error appears in the above-identified patent and that said Letters Patent is hereby corrected as shown below:

Column 1,
Line 29, after "substrates" insert -- . --;

Column 2,
Line 4, delete "amnino" and insert -- amino -- therefor;
Line 48, delete "arninosilane" and insert -- aminosilane -- therefor;
Line 52, delete "N-ethyl-3-anino" and insert -- N-ethyl-3-amino -- therefor;
Line 56, delete "N-ethyl4-amino-2" and insert -- N-ethyl-4-amino-2 -- therefor;

Column 4,
Line 18, delete "ORIGINS$^{TM}$" and insert -- ORIGIN$^{TM}$ -- therefor;
Line 39, delete "hake" and insert -- have -- therefor;
Line 67, delete "exarnple" and insert -- example -- therefor;

Column 5,
Line 56, delete "terninated" and insert -- terminated -- therefor;

Column 6
Line 6, delete "Othlmer" and insert -- Othmer -- therefor;
Line 10, delete "isocyanate-fiunctional" and insert -- isocyanate-functional -- therefor, Column 8,
Line 64, after "area" insert -- . --;

Column 9,
Line 18, delete "Thermnosell" and insert -- Thermosell -- therefor;

Column 10,
Line 46, delete "Comiarative" and insert -- Comparative -- therefor;

Column 11,
Line 42, delete "UTNILIN" and insert -- UNILIN -- therefor;
Lines 55-56, delete "(Nn-butyl)" and insert -- (N-(n-butyl) -- therefor;
Line 58, delete "SILQUESTO®" and insert -- SILQUEST® -- therefor;

Column 12,
Line 61, delete "hydroxylcontaining" and insert -- hydroxyl-containing -- therefor;
Line 62, delete "thernal" and insert -- thermal -- therefor;

UNITED STATES PATENT AND TRADEMARK OFFICE
CERTIFICATE OF CORRECTION

PATENT NO. : 6,749,943 B1
DATED : June 15, 2004
INVENTOR(S) : Tangen, John C.

It is certified that error appears in the above-identified patent and that said Letters Patent is hereby corrected as shown below:

Column 15,
Line 60, delete "disordering" and insert -- dis-ordering -- therefor;

Column 18,
Line 63, delete "cormponents" and insert -- components -- therefor;

Column 19,
Line 4, after "functionality" delete "," and insert --; -- therefor;
Line 6, delete "$R_0$-$NR_1$-$R_1$Si" and insert -- $R_0$-$NR_1$-$R_2$-Si -- therefor;
Line 13, delete "$C_1$-$C_0$" and insert -- $C_1$-$C_6$ -- therefor;
Line 18, after "claim 1" delete ",";
Line 24, after "curable" insert -- , --;
Line 34, after "curable" insert -- , --;
Lines 36-37, delete "1,5pentanediol" and insert -- 1,5-pentanediol -- therefor;
Line 37, delete "1,8-bctanediol" and insert -- 1,8-octanediol -- therefor;
Lines 37-38, delete "1,10decanediol" and insert -- 1,10-decanediol -- therefor;
Line 40, after "curable" insert -- , --;
Line 43, after "curable" insert -- , --;
Line 44, delete "dicarbpxylic" and insert -- dicarboxylic -- therefor;
Line 49, after "curable" insert -- , --;
Lines 49-50, after "sealant" insert -- composition --;
Line 50, delete "semicrystailine" and insert -- semi-crystalline -- therefor;
Line 65, after "curable" insert -- , --;

Column 20,
Line 11, delete "following" and insert -- foregoing -- therefor;
Line 16, after "curable" insert -- , --;
Line 27, delete "methylpropyidiethoxymethylsilane" and insert
-- methylpropyldiethoxymethylsilane -- therefor;
Line 29, delete "methylpropyltriethoxymethylsilane" and insert
-- methylpropyldimethoxymethylsilane -- therefor;
Line 31, delete "dimethylbutyldlmethoxymethylsilane" and insert
-- dimethylbutyldimethoxynmethylsilane -- therefor;
Line 34, after "curable" insert -- , --;
Line 40, after "curable" insert -- , --;
Line 43, delete "diphenylmethane-2,4-diisocyanate;" and insert -- diphenylmethane-2,4'-diisocyanate, -- therefor;
Lines 43-44, delete "04,4-diisocyanate" and insert -- 4,4'-diisocyanate -- therefor;
Line 46, delete "4,4'4"-triisocyanate" and insert -- 4,4',4"-triisocyanate -- therefor;

UNITED STATES PATENT AND TRADEMARK OFFICE
CERTIFICATE OF CORRECTION

PATENT NO.    : 6,749,943 B1
DATED         : June 15, 2004
INVENTOR(S)   : Tangen, John C.

It is certified that error appears in the above-identified patent and that said Letters Patent is hereby corrected as shown below:

Column 20 (cont'd),
Line 48, delete "biphenylene4,4'-diisocyanate" and insert -- biphenylene-4,4'-diisocyanate -- therefor;
Line 52, after "curable" insert -- , --;
Line 53, delete "semi-rystalline" and insert -- semi-crystalline -- therefor,
Line 54, delete "adipate," and insert -- adipate; -- therefor;
Line 56, delete "groups" and insert -- groups; -- therefor;
Line 57, delete "N'-ethyl" and insert -- N-ethyl -- therefor;
Line 57, delete "propyltrmethoxysilane" and insert -- propyltrimethoxysilane --, therefor;
Line 58, delete "4,4'diphenylmethane" and insert -- 4,4'-diphenylmethane -- therefor, Column 21,
Line 10, after "composition" delete "," and insert -- ; -- therefor;
Line 15, after "aliphatic" delete "." and insert -- , -- therefor;
Line 50, after "acids" delete "," and insert --; -- therefor;
Line 54, delete "polyhexmethylene" and insert -- polyhexamethylene -- therefor;

Column 22,
Line 8, delete "1.2-propanediol" and insert -- 1,2-propanediol -- therefor;
Line 10, delete "following" and insert -- foregoing -- therefor;
Line 12, delete "whereinthe" and insert -- wherein the -- therefor,
Lines 19-20, delete "The moisture curable hot melt adhesive and/or sealant composition of claim 1" and insert -- The method of claim 24 -- therefor;
Line 28, delete "methylpropyltriethoxymethylsilane" and insert -- methylpropyldimethoxymethylsilane -- therefor;
Line 29, delete "dimethylbutyltriethoxymethylsilane" and insert -- dimethylbutyldimethoxymethylsilane --therefor;
Lines 32-33, delete "The moisture curable hot melt adhesive and/or sealant composition of claim 1" and insert -- The method of claim 24 -- therefor;
Line 40, delete "2,4-diisocyanate; " and insert -- 2,4'-diisocyanate, -- therefor;
Lines 40-41, delete "4,4-diisocyanate" and insert -- 4,4'-diisocyanate -- therefor,
Line 43, delete "4,4'4"-triisocyanate" and insert -- 4,4',4"-triisocyanate -- therefor,
Line 45, delete "diphenylisopropylidine4,4'diisocyanate" and insert -- diphenylisopropylidine-4,4'-diisocyanate -- therefor;
Line 47, delete "dIIsocyanate" and insert -- diisocyanate -- therefor;
Line 47, delete "diisocyanate;" and insert -- diisocyanate -- therefor;
Line 51, delete "adipate," and insert -- adipate; -- therefor;
Line 53, delete "groups" and insert -- groups; -- therefor;

UNITED STATES PATENT AND TRADEMARK OFFICE
CERTIFICATE OF CORRECTION

PATENT NO. : 6,749,943 B1
DATED : June 15, 2004
INVENTOR(S) : Tangen, John C.

It is certified that error appears in the above-identified patent and that said Letters Patent is hereby corrected as shown below:

Column 22 (cont'd),
Line 54, delete "N'-ethyl" and insert -- N-ethyl -- therefor;
Line 54, delete "propyltrmethoxysilane" and insert -- propyltrimethoxysilane -- therefor;
Line 55, delete "cured" and insert -- curable, hot melt -- therefor;
Line 55-57, delete "derived from the curable, hot melt adhesive and/or sealant composition" and insert -- made according to the method -- therefor.

Signed and Sealed this

Twenty-eighth Day of June, 2005

JON W. DUDAS
*Director of the United States Patent and Trademark Office*